US012720339B2

(12) United States Patent
Kim

(10) Patent No.: US 12,720,339 B2
(45) Date of Patent: Aug. 25, 2026

(54) METHOD AND APPARATUS FOR SELECTIVE EARLY MEASUREMENT IN A WIRELESS COMMUNICATION SYSTEM

(71) Applicant: LG ELECTRONICS INC., Seoul (KR)

(72) Inventor: Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 598 days.

(21) Appl. No.: 17/953,480

(22) Filed: Sep. 27, 2022

(65) Prior Publication Data

US 2023/0328558 A1 Oct. 12, 2023

Related U.S. Application Data

(60) Provisional application No. 63/328,282, filed on Apr. 7, 2022.

(51) Int. Cl.
*H04W 24/08* (2009.01)
*H04W 68/00* (2009.01)
*H04W 76/10* (2018.01)

(52) U.S. Cl.
CPC ......... *H04W 24/08* (2013.01); *H04W 68/005* (2013.01); *H04W 76/10* (2018.02)

(58) Field of Classification Search
None
See application file for complete search history.

(56) References Cited

U.S. PATENT DOCUMENTS

2018/0368018 A1 12/2018 Kim et al.
2022/0046747 A1* 2/2022 Da Silva ........... H04W 52/0229
2022/0116810 A1* 4/2022 Rugeland .......... H04W 28/0278
2022/0124532 A1* 4/2022 Rugeland .............. H04W 76/27
2022/0132348 A1* 4/2022 Orsino .................. H04W 76/27
2022/0150739 A1* 5/2022 Da Silva ........... H04W 12/0431
2022/0150741 A1* 5/2022 Teyeb ..................... H04L 5/001
2022/0182859 A1* 6/2022 Da Silva ........... H04W 52/0219
2022/0182893 A1* 6/2022 Da Silva ........... H04W 36/0058
2022/0217563 A1* 7/2022 Teyeb ................... H04W 24/10
2022/0312354 A1* 9/2022 Teyeb ................ H04B 7/06952
2022/0345926 A1* 10/2022 Siomina ............ H04W 36/0058
(Continued)

FOREIGN PATENT DOCUMENTS

WO 2020165866 A1 8/2020
WO 2021162601 A1 8/2021
WO WO-2023005799 A1 * 2/2023 ............ H04W 40/02

OTHER PUBLICATIONS

Section 5.5 of 3GPP TS 38.331 v16.6.0.
(Continued)

*Primary Examiner* — Khaled M Kassim
*Assistant Examiner* — Shima Wasel
(74) *Attorney, Agent, or Firm* — BRYAN CAVE LEIGHTON PAISNER LLP

(57) ABSTRACT

A method and apparatus for selective early measurement in a wireless communication system is provided. A wireless device acquires information on one or more causes for early measurements. A wireless device initiates an RRC connection establishment procedure and/or an RRC connection resume procedure with a certain cause. A wireless device performs early measurements based on the certain cause being included in the one or more causes.

4 Claims, 20 Drawing Sheets

(56) References Cited

U.S. PATENT DOCUMENTS

| | | | | |
|---|---|---|---|---|
| 2022/0369180 | A1* | 11/2022 | Dange | H04W 48/20 |
| 2023/0032513 | A1* | 2/2023 | Dange | H04W 48/20 |
| 2023/0057408 | A1* | 2/2023 | Ramachandra | H04W 24/02 |
| 2023/0064410 | A1* | 3/2023 | Teyeb | H04W 76/19 |
| 2023/0262504 | A1* | 8/2023 | Jung | H04W 24/10<br>370/329 |
| 2024/0349099 | A1* | 10/2024 | Koskinen | H04W 24/10 |
| 2024/0357693 | A1* | 10/2024 | Zou | H04W 28/0252 |
| 2024/0381145 | A1* | 11/2024 | Rugeland | H04W 76/27 |
| 2024/0406846 | A1* | 12/2024 | Wu | H04W 48/10 |

OTHER PUBLICATIONS

Section 5.7.8 of 3GPP TS 38.331 v16.6.0.
Section 5.3.3 of 3GPP TS 38.331 v16.6.0.
Section 5.3.13 of 3GPP TS 38.331 v16.6.0.
Section 5.3.2 of 3GPP TS 38.331 v16.6.0.
Sony, "On providing quality report in Message 3", 3GPP TSG RAN WG1 Meeting #94, R1-1808351, Gothenburg, Sweden, Aug. 20-24, 2018, Retrieved from the Internet: URL:http://www.3gpp.org/ftp/tsg%5Fran/WG1% 5FRL1/TSGR1%5F94/Docs/R1%2D1808351%2Ezip [retrieved on Aug. 11, 2018].

* cited by examiner

Figure 1:
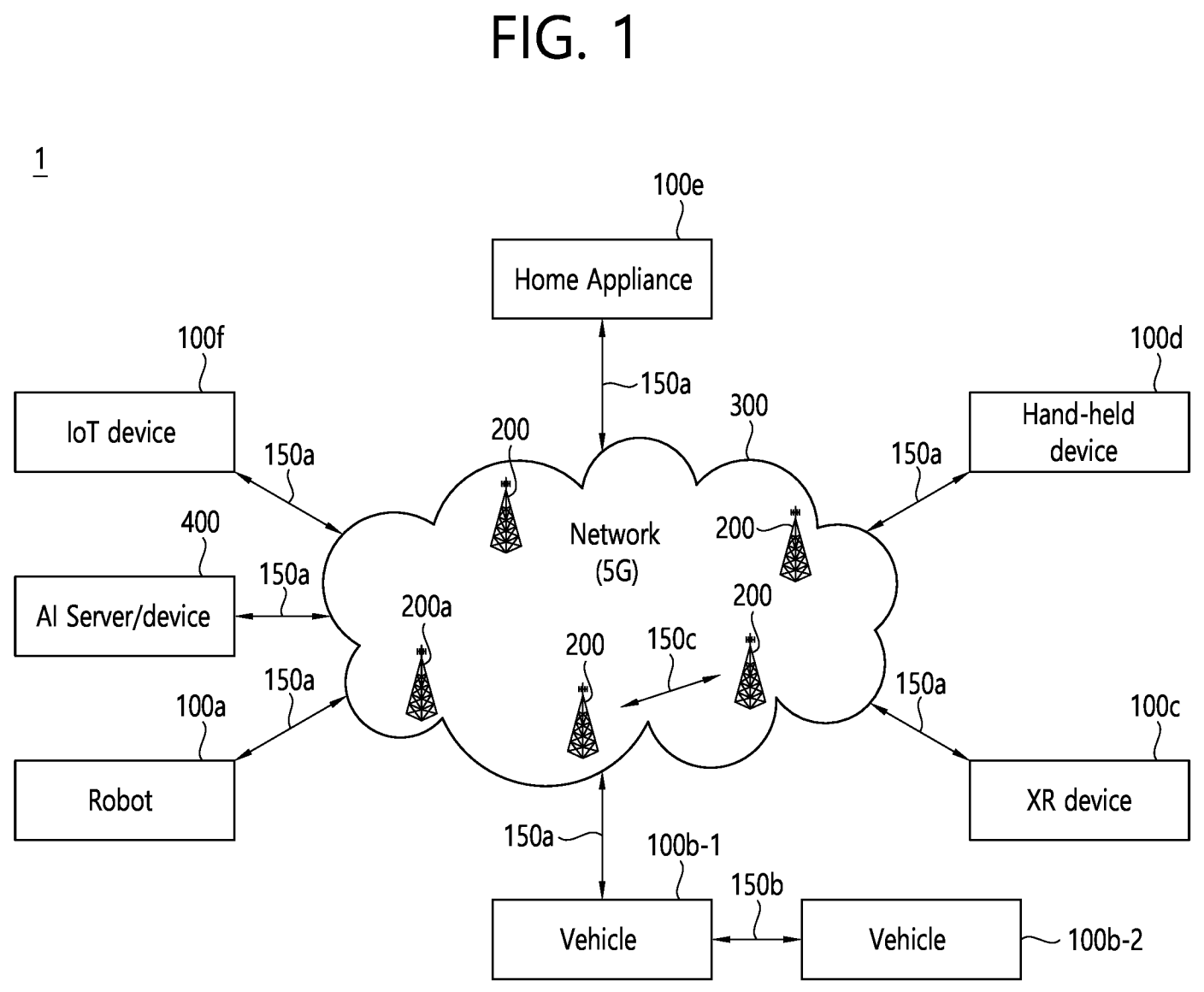

Hand-held device 100d

XR device 100c

Vehicle 100b-2

Home Appliance 100e

Network (5G) 300

200

200a

150a

150b

150c

Vehicle 100b-1

IoT device 100f

AI Server/device 400

Robot 100a

FIG. 3

METHOD AND APPARATUS FOR SELECTIVE EARLY MEASUREMENT IN A WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 63/328,282 filed on Apr. 7, 2022, the contents of which are all hereby incorporated by reference herein in their entirety.

BACKGROUND

Technical Field

The present disclosure relates to a method and apparatus for selective early measurement in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Technical Objects

In NR, frequency range 2 (FR2) may be supported. For example, FR2 may consist of the operational frequencies that have been allocated to 5G in the mmWave region (for example, above 24 GHz). These bands aim to provide high performance 5G as large amounts of bandwidths are available for use. Networks operating on FR2 bands can achieve gigabit data rates or even higher with extremely low latency.

Meanwhile, the enhanced early measurement can be useful for fast SCG setup on FR2. For example, UE may initiate the enhanced early measurement upon initiation of RRC connection setup/resume. However, UE may not need to perform the enhanced early measurement, if CA/DC operation is not required (for example, when the RRC connection setup/resume is initiated for MO signalling or voice call). In such cases, the enhanced early measurement just causes unnecessary UE power consumption.

Therefore, studies for selective early measurement in a wireless communication system are required.

Technical Solutions

In an aspect, a method performed by a wireless device in a wireless communication system is provided. A wireless device receives, from a network, an early measurement configuration. A wireless device acquires information on one or more causes for early measurements. A wireless device initiates a Radio Resource Control (RRC) connection establishment procedure and/or an RRC connection resume procedure with a certain cause. A wireless device performs early measurements based on the certain cause being included in the one or more causes, upon initiating the RRC connection establishment procedure and/or the RRC connection resume procedure. A wireless device reports results of the early measurements.

In another aspect, an apparatus for implementing the above method is provided.

Technical Effects

The present disclosure can have various advantageous effects.

According to some embodiments of the present disclosure, a wireless device could selectively perform the early measurement by considering the purpose of the RRC connection.

For example, while the wireless device camps on a cell in FR2, the wireless device could save power by performing the selective early measurement.

For example, UE can save power by initiating the enhanced early measurement selectively depending on the purpose of the RRC connection establishment/resume.

In other words, in the case of FR2, the results of early measurement may not be valid for a long time. Since the early measurements are performed for fast AC/DC setup and the fast AC/DC are only needed under certain situations (for example, having certain causes), the early measurements may be necessary only in the certain situations. According to the present disclosure, it is possible to save resources by performing the early measurements only in the certain situations.

According to some embodiments of the present disclosure, a wireless network system could provide an efficient solution for the early measurement considering the purpose of the RRC connection.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 3 shows an example of a wireless device to which implementations of the present disclosure is applied.

DETAILED DESCRIPTION

Figure 2:
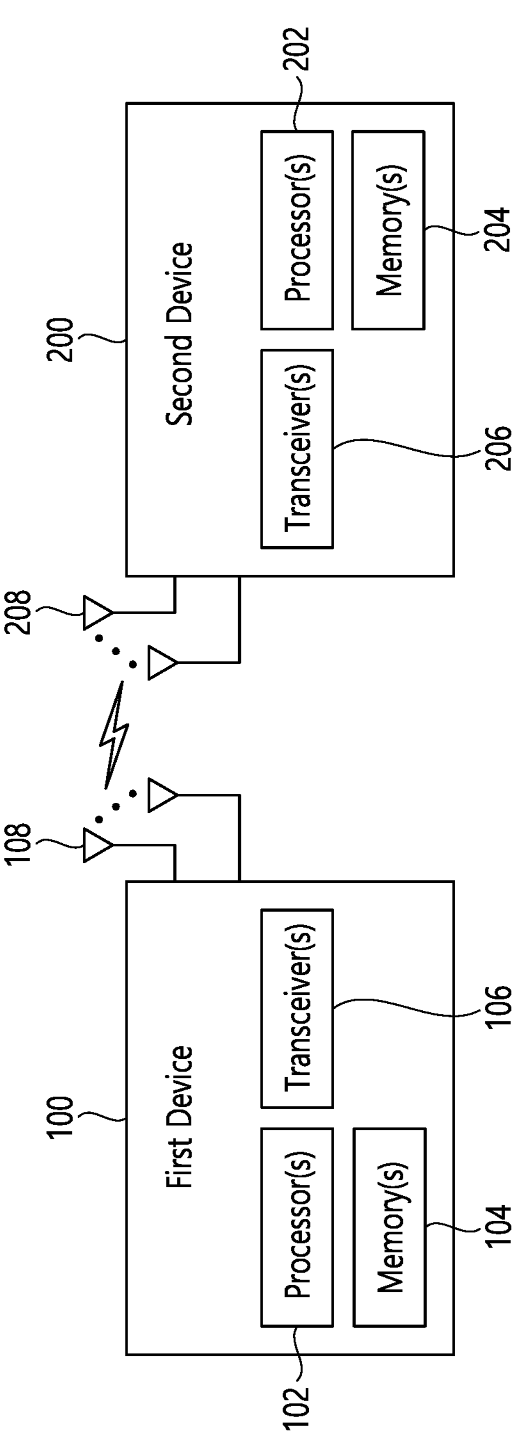
FIG. 2 shows an example of wireless devices to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
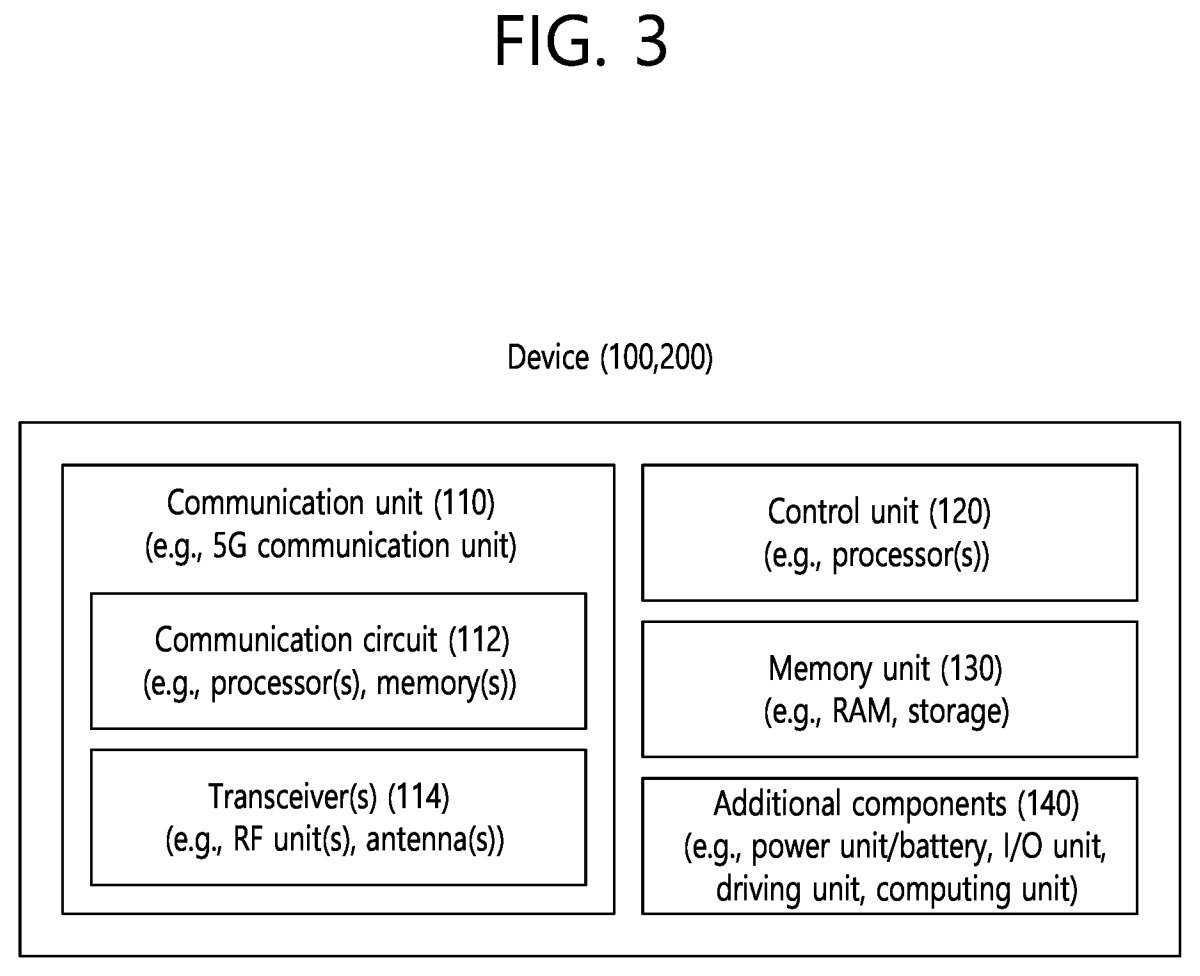

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
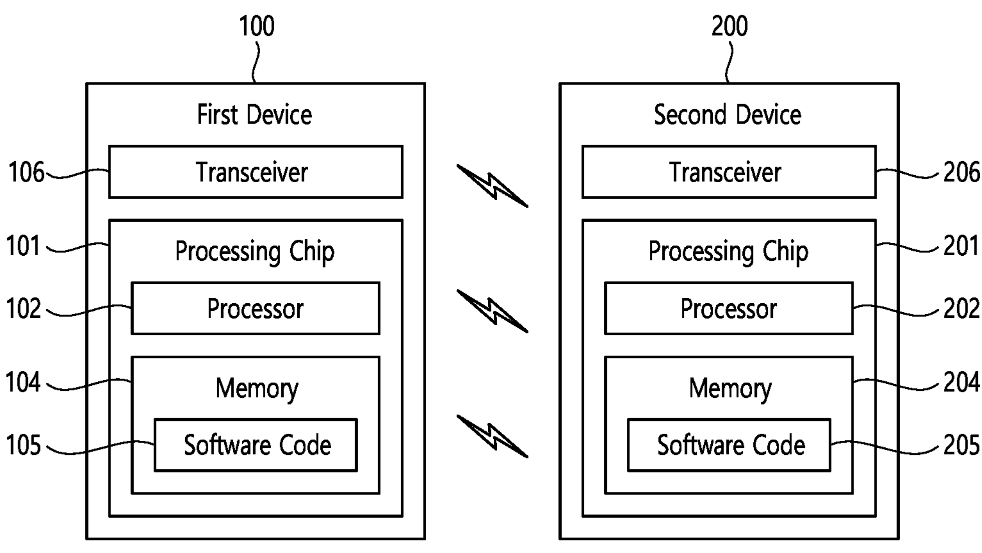
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
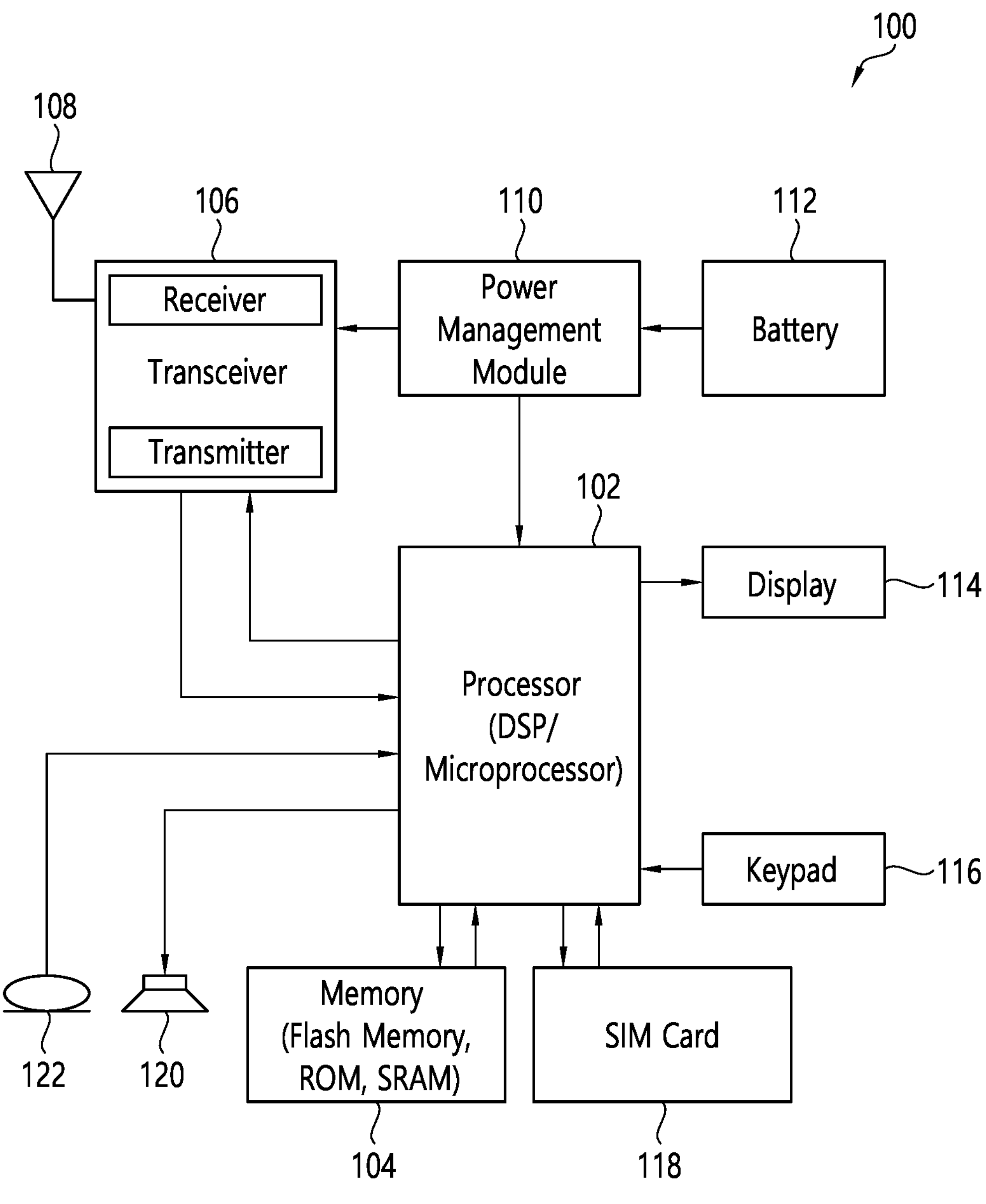
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
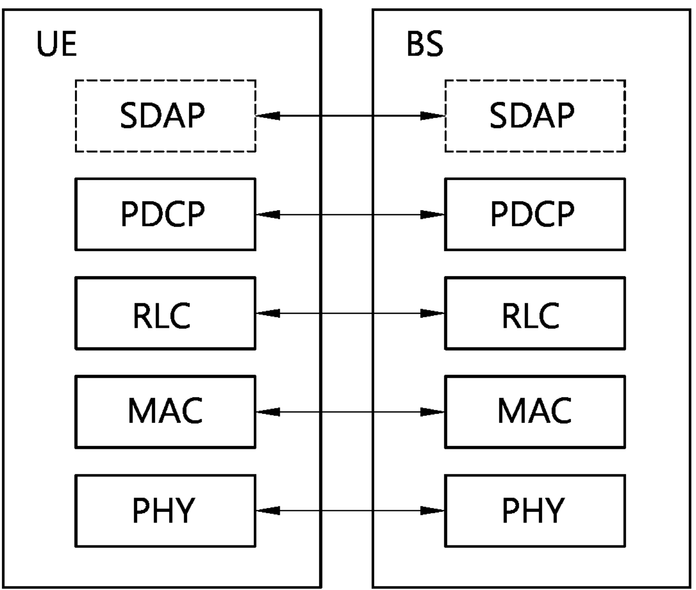
FIGS. 6 and 7 show an example of protocol stacks in a 3GPP based wireless communication system to which implementations of the present disclosure is applied.
Figure 7:
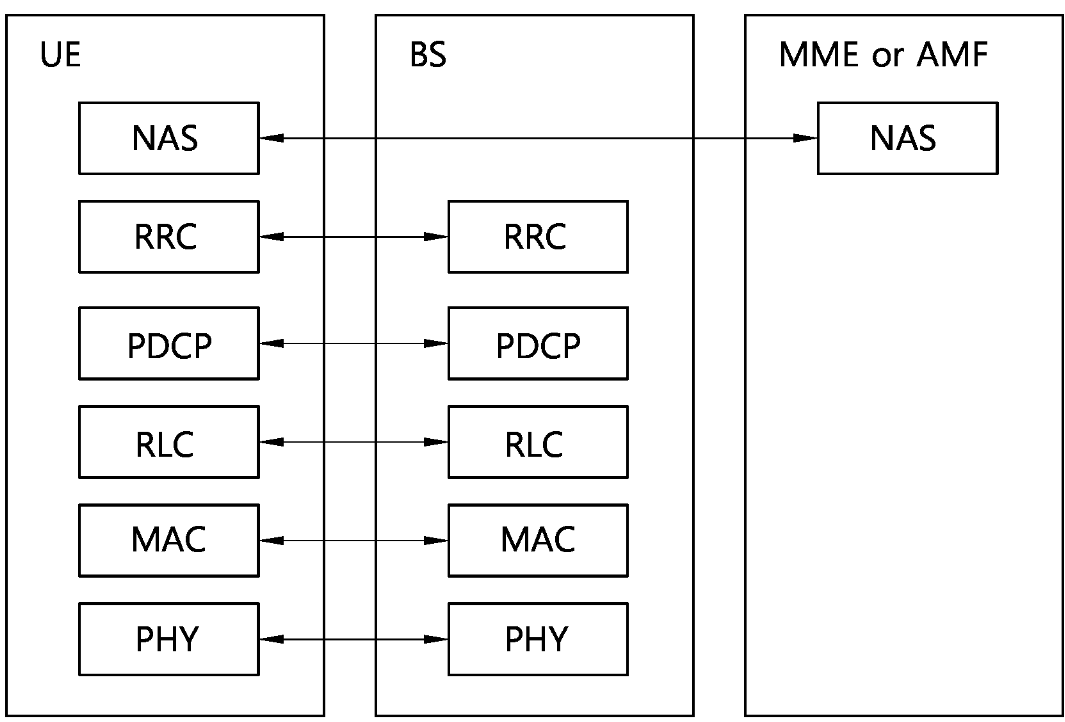

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
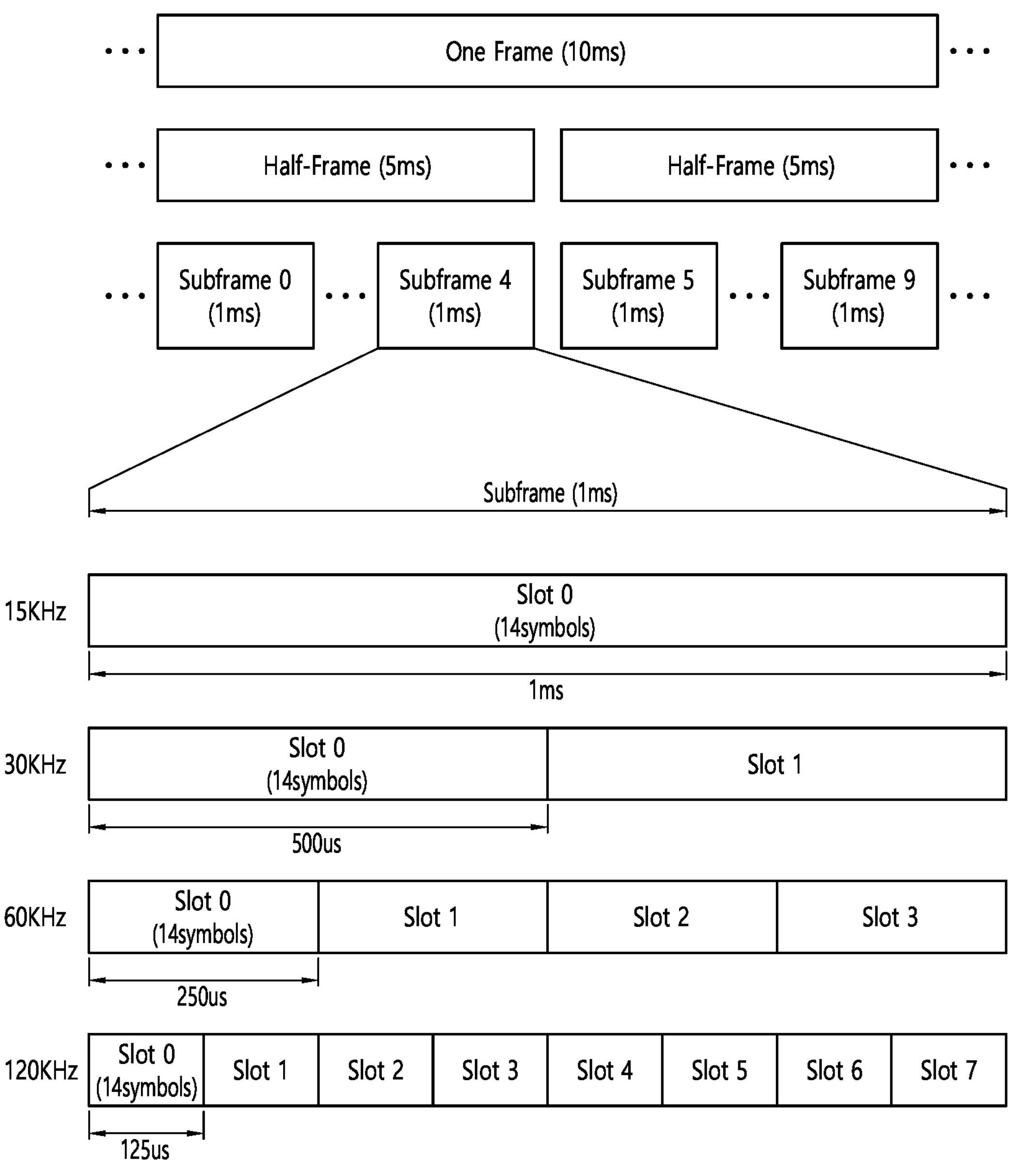
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{slot}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{start,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
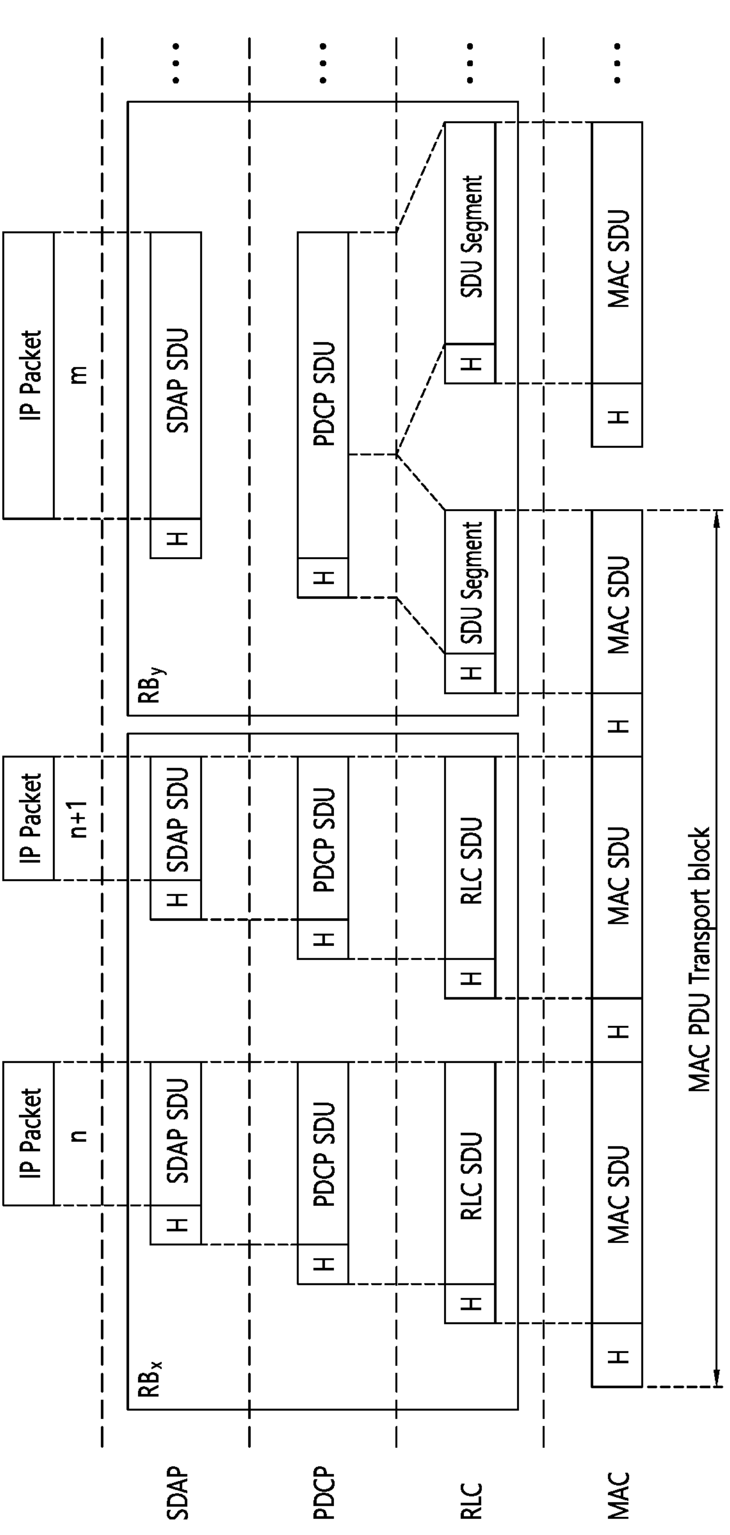
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, technical features related to measurements are described. Section 5.5 of 3GPP TS 38.331 v16.6.0 may be referred.

The network may configure an RRC_CONNECTED UE to perform measurements. The network may configure the UE to report them in accordance with the measurement configuration or perform conditional reconfiguration evaluation in accordance with the conditional reconfiguration. The measurement configuration is provided by means of dedicated signalling i.e. using the RRCReconfiguration or RRCResume.

The Network May Configure the UE to Perform the Following Types of Measurements:

NR measurements;

Inter-RAT measurements of E-UTRA frequencies.

Inter-RAT measurements of UTRA-FDD frequencies.

The network may configure the UE to report the following measurement information based on SS/PBCH block(s):

Measurement results per SS/PBCH block;

Measurement results per cell based on SS/PBCH block(s);

SS/PBCH block(s) indexes.

The network may configure the UE to report the following measurement information based on CSI-RS resources:

Measurement results per CSI-RS resource;

Measurement results per cell based on CSI-RS resource (s);

CSI-RS resource measurement identifiers.

The network may configure the UE to perform the following types of measurements for NR sidelink and V2X sidelink:

CBR measurements.

The network may configure the UE to report the following CLI measurement information based on SRS resources:

Measurement results per SRS resource;

SRS resource(s) indexes.

The network may configure the UE to report the following CLI measurement information based on CLI-RSSI resources:

Measurement results per CLI-RSSI resource;

CLI-RSSI resource(s) indexes.

The Measurement Configuration Includes the Following Parameters:

1. Measurement objects: A list of objects on which the UE shall perform the measurements.

For intra-frequency and inter-frequency measurements a measurement object indicates the frequency/time location and subcarrier spacing of reference signals to be measured. Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

The measObjectId of the MO which corresponds to each serving cell is indicated by servingCellMO within the serving cell configuration.

For inter-RAT E-UTRA measurements a measurement object is a single E-UTRA carrier frequency. Associated with this E-UTRA carrier frequency, the network can configure a list of cell specific offsets and a list of 'blacklisted' cells. Blacklisted cells are not applicable in event evaluation or measurement reporting.

For inter-RAT UTRA-FDD measurements a measurement object is a set of cells on a single UTRA-FDD carrier frequency.

For CBR measurement of NR sidelink communication, a measurement object is a set of transmission resource pool(s) on a single carrier frequency for NR sidelink communication.

For CLI measurements a measurement object indicates the frequency/time location of SRS resources and/or CLI-RSSI resources, and subcarrier spacing of SRS resources to be measured.

2. Reporting configurations: A list of reporting configurations where there can be one or multiple reporting configurations per measurement object. Each measurement reporting configuration consists of the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g. RSRP) and other associated information such as the maximum number of cells and the maximum number beams per cell to report.

In Case of Conditional Reconfiguration, Each Configuration Consists of the Following:

Execution criteria: The criteria the UE uses for conditional reconfiguration execution.

RS type: The RS that the UE uses for obtaining beam and cell measurement results (SS/PBCH block-based or CSI-RS-based), used for evaluating conditional reconfiguration execution condition.

3. Measurement identities: For measurement reporting, a list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network. For conditional reconfiguration triggering, one measurement identity links to exactly one conditional reconfiguration trigger configuration. And up to 2 measurement identities can be linked to one conditional reconfiguration execution condition.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

A UE in RRC_CONNECTED maintains a measurement object list, a reporting configuration list, and a measurement identities list according to signalling and procedures in this specification. The measurement object list possibly includes NR measurement object(s), CLI measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

The Measurement Procedures Distinguish the Following Types of Cells:

1. The NR serving cell(s)—these are the SpCell and one or more SCells.

2. Listed cells—these are cells listed within the measurement object(s).

3. Detected cells—these are cells that are not listed within the measurement object(s) but are detected by the UE on the SSB frequency(ies) and subcarrier spacing(s) indicated by the measurement object(s).

For NR measurement object(s), the UE measures and reports on the serving cell(s), listed cells and/or detected cells. For inter-RAT measurements object(s) of E-UTRA, the UE measures and reports on listed cells and detected cells and, for RSSI and channel occupancy measurements, the UE measures and reports on the configured resources on the indicated frequency. For inter-RAT measurements object (s) of UTRA-FDD, the UE measures and reports on listed cells. For CLI measurement object(s), the UE measures and reports on configured measurement resources (i.e. SRS resources and/or CLI-RSSI resources).

Whenever the procedural specification, refers to a field it concerns a field included in the VarMeasConfig unless explicitly stated otherwise i.e. only the measurement configuration procedure covers the direct UE action related to the received measConfig.

In NR-DC, the UE May Receive Two Independent measConfig:

a measConfig, associated with MCG, that is included in the RRCReconfiguration message received via SRB1; and a measConfig, associated with SCG, that is included in the RRCReconfiguration message received via SRB3, or, alternatively, included within a RRCReconfiguration message embedded in a RRCReconfiguration message received via SRB1.

In this case, the UE maintains two independent VarMeasConfig and VarMeasReportList, one associated with each measConfig, and independently performs all the procedures for each measConfig and the associated VarMeasConfig and VarMeasReportList, unless explicitly stated otherwise.

The configurations related to CBR measurements are only included in the measConfig associated with MCG.

An RRC_CONNECTED UE shall derive cell measurement results by measuring one or multiple beams associated per cell as configured by the network. For all cell measurement results, except for RSSI, and CLI measurement results in RRC_CONNECTED, the UE applies the layer 3 filtering, before using the measured results for evaluation of reporting criteria, measurement reporting or the criteria to trigger conditional reconfiguration execution. For cell measurements, the network can configure RSRP, RSRQ, SINR, RSCP or EcN0 as trigger quantity. For CLI measurements, the network can configure SRS-RSRP or CLI-RSSI as trigger quantity. For cell and beam measurements, reporting quantities can be any combination of quantities (i.e. only RSRP; only RSRQ; only SINR; RSRP and RSRQ; RSRP and SINR; RSRQ and SINR; RSRP, RSRQ and SINR; only RSCP; only EcN0; RSCP and Ec0), irrespective of the trigger quantity, and for CLI measurements, reporting quantities can be either SRS-RSRP or CLI-RSSI. For conditional reconfiguration execution, the network can configure up to 2 quantities, both using same RS type. The UE does not apply the layer 3 filtering to derive the CBR measurements.

The network may also configure the UE to report measurement information per beam (which can either be measurement results per beam with respective beam identifier(s) or only beam identifier(s)). If beam measurement information is configured to be included in measurement reports, the UE applies the layer 3 beam filtering. On the other hand, the exact L1 filtering of beam measurements used to derive cell measurement results is implementation dependent.

Hereinafter, technical features related to Idle/Inactive Measurements are described. Section 5.7.8 of 3GPP TS 38.331 v16.6.0 may be referred.

This procedure specifies the measurements to be performed and stored by a UE in RRC_IDLE and RRC_INACTIVE when it has an idle/inactive measurement configuration.

The purpose of this procedure is to update the idle/inactive measurement configuration.

The UE initiates this procedure while T331 is running and one of the following conditions is met:

1> upon selecting a cell when entering RRC_IDLE or RRC-INACTIVE from RRC_CONNECTED or RRC_INACTIVE; or 1> upon update of system information (SIB4, or SIB11), e.g. due to intra-RAT cell (re)selection;

While in RRC_IDLE or RRC_INACTIVE, and T331 is Running, the UE Shall:

1> if VarMeasIdleConfig includes neither a measIdleCarrierListEUTRA nor a measIdleCarrierListNR received from the RRCRelease message:

2> if the UE supports idLeInactiveEUTRA-MeasReport:

3> if the SIB11 includes the measIdleConfigSIB and contains measIdleCarrierListEUTRA:

4> store or replace the measIdleCarrierListEUTRA of measIdleConfigSIB of SIB11 within VarMeasIdleConfig;

3> else:

4> remove the measIdleCarrierListEUTRA in VarMeasIdleConfig, if stored;

2> if the UE supports idleInactiveNR-MeasReport:

3> if SIB11 includes the measIdleConfigSIB and contains measIdleCarrierListNR:

4> store or replace the measIdleCarrierListNR of measIdleConfigSIB of SIB11 within VarMeasIdleConfig;

3> else:

4> remove the measIdleCarrierListNR in VarMeasIdleConfig, if stored;

1> for each entry in the measIdleCarrierListNR within VarMeasIdleConfig that does not contain an ssb-MeasConfig received from the RRCRelease message:

2> if there is an entry in measIdleCarrierListNR in measIdleConfigSIB of SIB11 that has the same carrier frequency and subcarrier spacing as the entry in the measIdleCarrierListNR within VarMeasIdleConfig and that contains ssb-MeasConfig:

3> delete the ssb-MeasConfig of the corresponding entry in the measIdleCarrierListNR within VarMeasIdleConfig;

3> store the SSB measurement configuration from SIB11 into nrofSS-BlocksToAverage, absThreshSS-BlocksConsolidation, smtc, ssb-ToMeasure, deriveSSB-IndexFromCell, and ss-RSSI-Measurement within ssb-MeasConfig of the corresponding entry in the measIdleCarrierListNR within VarMeasIdleConfig;

2> else if there is an entry in interFreqCarrierFreqList of SIB4 with the same carrier frequency and subcarrier spacing as the entry in measIdleCarrierListNR within VarMeasIdleConfig:

3> delete the ssb-MeasConfig of the corresponding entry in the measIdleCarrierListNR within VarMeasIdleConfig;

3> store the SSB measurement configuration from SIB4 into nrofSS-BlocksToAverage, absThreshSS-BlocksConsolidation, smtc, ssb-ToMeasure, deriveSSB-IndexFromCell, and ss-RSSI-Measurement within ssb- MeasConfig of the corresponding entry in the measIdleCarrierListNR within VarMeasIdleConfig;

2> else:

3> remove the ssb-MeasConfig of the corresponding entry in the measIdleCarrierListNR within VarMeasIdleConfig, if stored;

1> perform measurements.

When performing measurements on NR carriers according to this clause, the UE shall derive the cell quality and consider the beam quality to be the value of the measurement results of the concerned beam, where each result is averaged.

Hereinafter, technical features related to RRC connection setup are described. Section 5.3.3 of 3GPP TS 38.331 v16.6.0 may be referred.

Figure 10:
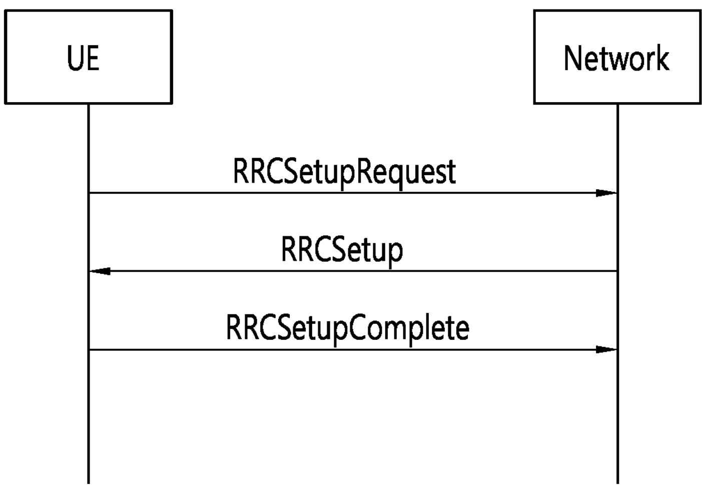
FIG. 10 shows an example of RRC connection establishment, successful.

FIG. 10 shows an example of RRC connection establishment, successful.

Referring to FIG. 10, a UE may transmit an RRC Setup Request to a network. The network may transmit an RRC Setup to the UE. The UE may transmit the RRC setup complete to the network.

Figure 11:
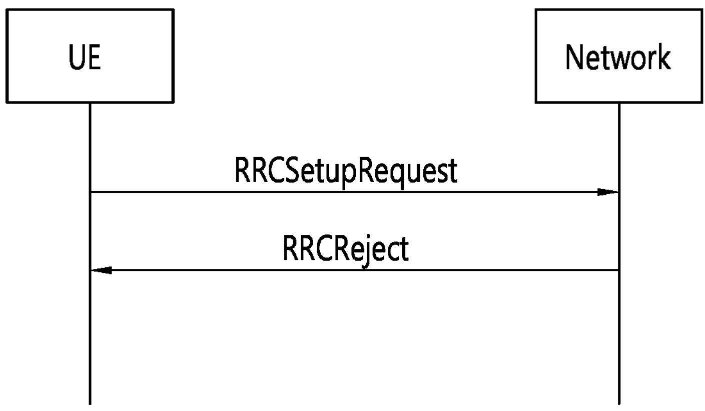
FIG. 11 shows example of RRC connection establishment, network reject.

FIG. 11 shows example of RRC connection establishment, network reject.

Referring to FIG. 11, a UE may transmit an RRC Setup Request to a network. The network may transmit an RRC Reject to the UE.

The purpose of this procedure is to establish an RRC connection. RRC connection establishment involves SRB1 establishment. The procedure is also used to transfer the initial NAS dedicated information/message from the UE to the network.

The Network Applies the Procedure e.g., as Follows:

When establishing an RRC connection;

When UE is resuming or re-establishing an RRC connection, and the network is not able to retrieve or verify the UE context. In this case, UE receives RRCSetup and responds with RRCSetupComplete.

The UE initiates the procedure when upper layers request establishment of an RRC connection while the UE is in RRC_IDLE and it has acquired essential system information.

The UE shall ensure having valid and up to date essential system information before initiating this procedure.

Upon initiation of the procedure, the UE shall:

1> if the upper layers provide an Access Category and one or more Access Identities upon requesting establishment of an RRC connection:

2> perform the unified access control procedure using the Access Category and Access Identities provided by upper layers;

3> if the access attempt is barred, the procedure ends;

1> apply the default L1 parameter values as specified in corresponding physical layer specifications except for the parameters for which values are provided in SIB1;

1> apply the default MAC Cell Group configuration;

1> apply the CCCH configuration;

1> apply the timeAlignmentTimerCommon included in SIB1;

1> start timer T300;

1> initiate transmission of the RRCSetupRequest message;

The UE shall set the contents of RRCSetupRequest message as follows:

1> set the ue-Identity as follows:

2> if upper layers provide a SG-S-TMSI:

3> set the ue-Identity to ng-5G-S-TMSI-Part1;

2> else:

3> draw a 39-bit random value in the range $0.2^{39}$-1 and set the ue-Identity to this value;

Upper layers provide the 5G-S-TMSI if the UE is registered in the TA of the current cell.

1> if the establishment of the RRC connection is the result of release with redirect with mpsPriorityIndication (either in NR or E-UTRAN):

2> set the establishmentCause to mps-PriorityAccess;

1> else:

2> set the establishmentCause in accordance with the information received from upper layers;

The UE shall submit the RRCSetupRequest message to lower layers for transmission.

The UE shall continue cell re-selection related measurements as well as cell re-selection evaluation. If the conditions for cell re-selection are fulfilled, the UE shall perform cell re-selection.

Hereinafter, technical features related to RRC connection resume are described. Section 5.3.13 of 3GPP TS 38.331 v16.6.0 may be referred.

Figure 12:
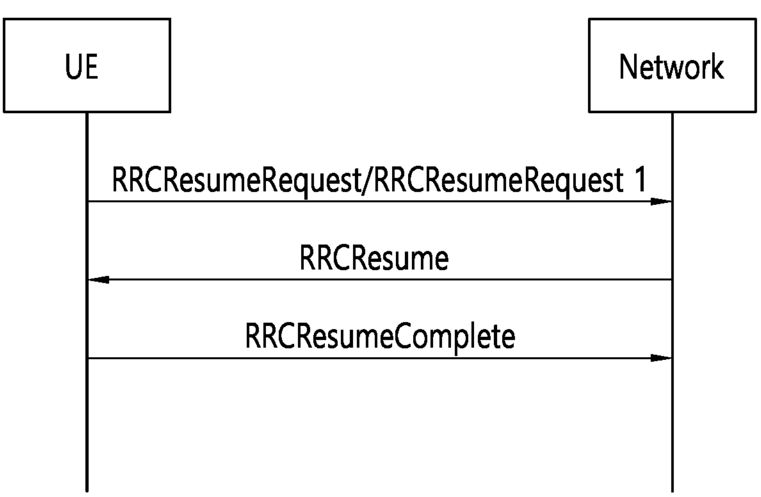
FIG. 12 shows an example of RRC connection resume, successful.

FIG. 12 shows an example of RRC connection resume, successful.

Referring to FIG. 12, a UE may transmit an RRC Resume Request or RRC Resume Request 1 to a network. The network may transmit an RRC Resume to the UE. The UE may transmit the RRC Resume complete to the network.

Figure 13:
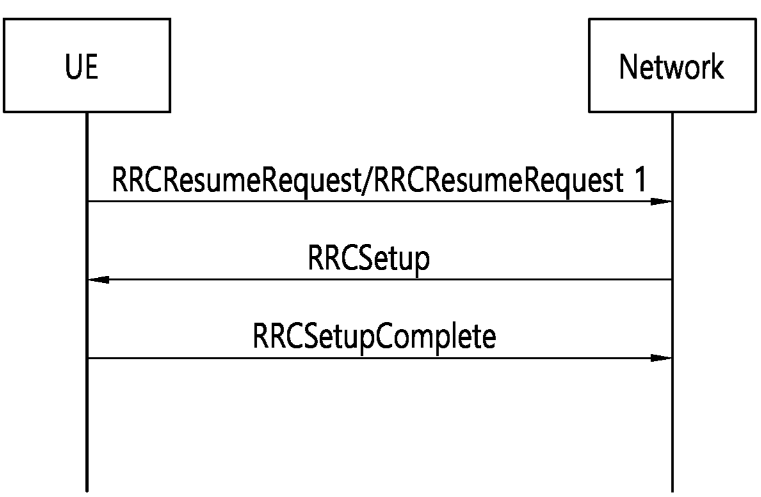
FIG. 13 shows example of RRC connection resume fallback to RRC connection establishment, successful.

FIG. 13 shows example of RRC connection resume fallback to RRC connection establishment, successful.

Referring to FIG. 13, a UE may transmit an RRC Resume Request or RRC Resume Request 1 to a network. The network may transmit an RRC Setup to the UE. The UE may transmit the RRC Setup complete to the network.

Figure 14:
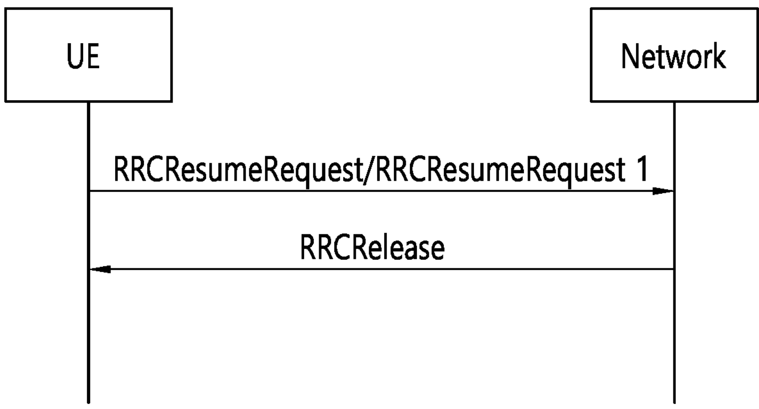
FIG. 14 shows example of RRC connection resume followed by network release, successful.

FIG. 14 shows example of RRC connection resume followed by network release, successful.

Referring to FIG. 14, a UE may transmit an RRC Resume Request or RRC Resume Request 1 to a network. The network may transmit an RRC Release to the UE.

Figure 15:
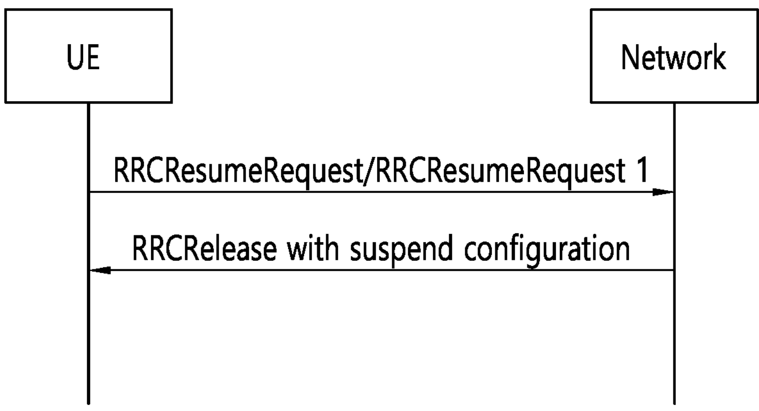
FIG. 15 shows example of RRC connection resume followed by network suspend, successful.

FIG. 15 shows example of RRC connection resume followed by network suspend, successful.

Referring to FIG. 15, a UE may transmit an RRC Resume Request or RRC Resume Request 1 to a network. The network may transmit an RRC Release with suspend configuration to the UE.

Figure 16:
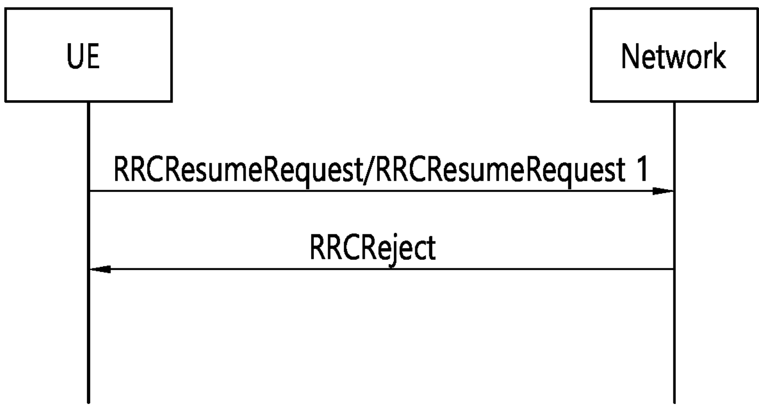
FIG. 16 shows example of RRC connection resume followed by network suspend, successful.

FIG. 16 shows example of RRC connection resume followed by network suspend, successful.

Referring to FIG. 16, a UE may transmit an RRC Resume Request or RRC Resume Request 1 to a network. The network may transmit an RRC Reject to the UE.

The purpose of this procedure is to resume a suspended RRC connection, including resuming SRB(s) and DRB(s) or perform an RNA update.

The UE initiates the procedure when upper layers or AS (when responding to RAN paging, upon triggering RNA updates while the UE is in RRC_INACTIVE, or for NR sidelink communication/V2X sidelink communication) requests the resume of a suspended RRC connection.

Hereinafter, technical features related to paging are described. Section 5.3.2 of 3GPP TS 38.331 v16.6.0 may be referred.

Figure 17:
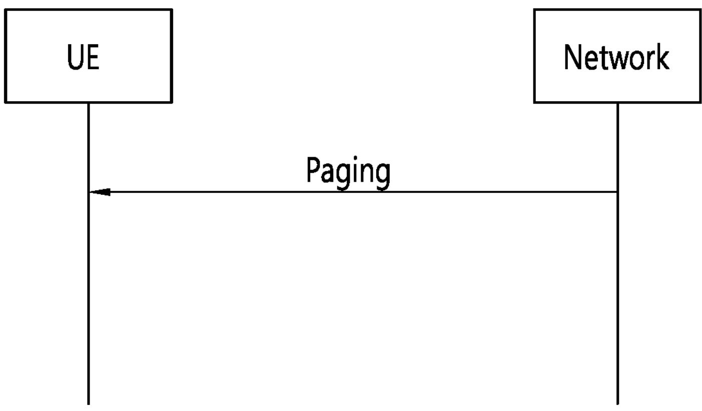
FIG. 17 shows an example of paging procedure.

FIG. 17 shows an example of paging procedure.

Referring to FIG. 17, a network may transmit a paging to a UE.

The Purpose of this Procedure is:

to transmit paging information to a UE in RRC_IDLE or RRC_INACTIVE.

The network initiates the paging procedure by transmitting the Paging message at the UE's paging occasion. The network may address multiple UEs within a Paging message by including one PagingRecord for each UE.

In NR, frequency range 2 (FR2) may be supported. For example, FR2 may consist of the operational frequencies that have been allocated to 5G in the mmWave region (for example, above 24 GHz). These bands aim to provide high performance 5G as large amounts of bandwidths are available for use. Networks operating on FR2 bands can achieve gigabit data rates or even higher with extremely low latency.

In order to study technical features related to FR2 (that is, (i) the impact of FR2 RRM mobility measurement acquisition and reporting on FR2 SCell/SCG setup/resume delay for a UE connecting from idle/inactive mode and/or (ii) the level of feasible improvement in FR2 SCell/SCG setup delay from defining new UE measurement procedures and RRM core requirements, and whether additional information from the network would help the UE to perform those measurements effectively), the following sequence of events should be assumed: (i) the UE initiates and performs improved measurements when it requests RRC connection setup/resume; and (ii) after acquiring those improved measurements, the UE subsequently reports those measurements to the network to support SCell/SCG setup.

Meanwhile, the enhanced early measurement can be useful for fast SCG setup on FR2. For example, UE may initiate the enhanced early measurement upon initiation of RRC connection setup/resume. However, UE may not need to perform the enhanced early measurement, if CA/DC operation is not required (for example, when the RRC connection setup/resume is initiated for MO signalling or voice call). In such cases, the enhanced early measurement just causes unnecessary UE power consumption.

Therefore, studies for selective early measurement in a wireless communication system are required.

Hereinafter, a method for selective early measurement in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 18:
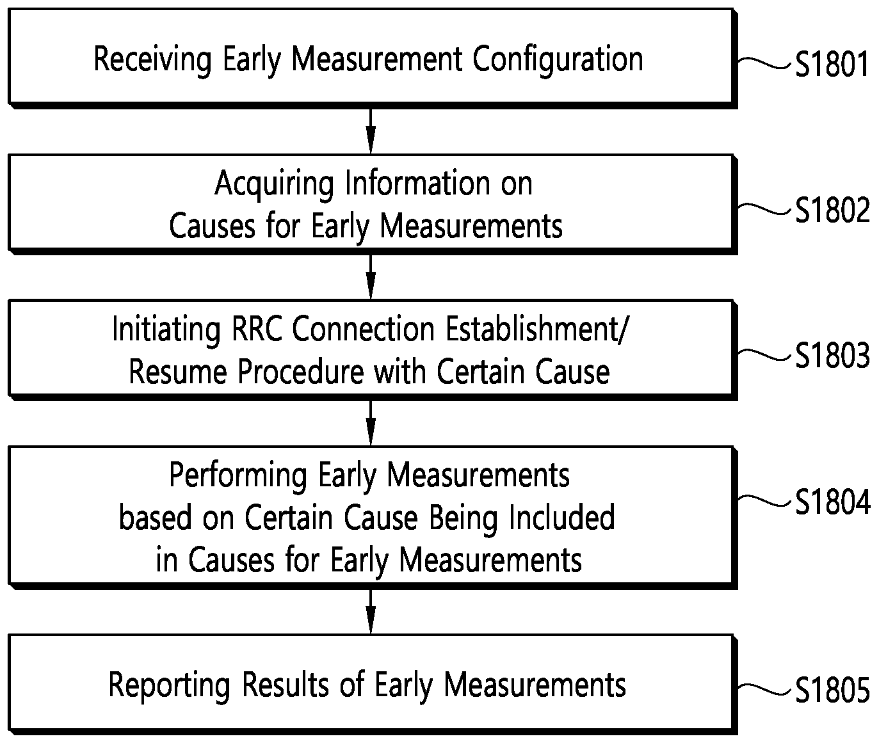
FIG. 18 shows an example of a method for selective early measurement in a wireless communication system, according to some embodiments of the present disclosure.

FIG. 18 shows an example of a method for selective early measurement in a wireless communication system, according to some embodiments of the present disclosure.

In particular, FIG. 18 shows an example of a method performed by a wireless device in a wireless communication system.

In step S1801, a wireless device may receive, from a network, an early measurement configuration.

For example, the early measurement configuration may be provided via system information. For example, the network may transmit (for example, broadcast) the system information (for example, SIB11) including the early measurement configuration to the wireless device.

In step S1802, a wireless device may acquire information on one or more causes for early measurements.

For example, the one or more causes for early measurements may be preconfigured to the wireless device. For example, the one or more causes for early measurements may be stored in a Universal Subscriber Identity Module (USIM) of the wireless device.

For example, the one or more causes for early measurements may be included in the early measurement configuration.

For example, the one or more causes may include at least one of (i) an RRC connection establishment cause, (ii) an RRC connection resume cause, and/or (iii) a paging cause.

For example, the RRC connection establishment cause may include at least one of emergency, highPriorityAccess, mt-Access, mo-Signalling, mo-Data, mo-VoiceCall, mo-VideoCall, mo-SMS, mps-PriorityAccess, and/or mcs-PriorityAccess.

For example, the RRC connection resume cause may include at least one of emergency, highPriorityAccess, mt-Access, mo-Signalling, mo-Data, mo-VoiceCall, mo-VideoCall, mo-SMS, ma-Update, mps-PriorityAccess, and/or mcs-PriorityAccess.

For example, the paging cause may include a service type (for example, a voice call).

In step S1803, a wireless device may initiate a Radio Resource Control (RRC) connection establishment procedure and/or an RRC connection resume procedure with a certain cause.

For example, the wireless device may receive a paging message from the network and initiate the RRC connection establishment procedure and/or the RRC connection resume procedure.

In step S1804, a wireless device may perform early measurements based on the certain cause being included in the one or more causes, upon initiating the RRC connection establishment procedure and/or the RRC connection resume procedure.

According to some embodiments of the present disclosure, in step S1803, the wireless device may determine (i) a specific RRC connection establishment cause for the RRC connection establishment procedure and/or (ii) a specific RRC connection resume cause for the RRC connection resume procedure as the certain cause.

For example, the wireless device may determine the RRC connection establishment cause as follows:

If the establishment of the RRC connection procedure is the result of release with redirect with mpsPriorityIndication, the wireless device may consider the RRC connection establishment Cause is mps-PriorityAccess. If not, the wireless device may set the RRC connection establishment Cause in accordance with the information received from upper layers, for example, a NAS layer.

For example, the wireless device may determine the RRC connection resume cause as follows:

When the resume of the RRC connection is triggered by receiving a paging message, if the wireless device is configured by upper layers with Access Identity 1, the wireless device may consider the resumeCause is mps-PriorityAccess. Else if the wireless device is configured by upper layers with Access Identity 2, the wireless device may consider the resumeCause is highPriorityAccess. Else if the wireless device is configured by upper layers with one or more Access Identities equal to 11-15, the wireless device may consider the resumeCause is mcs-PriorityAccess. Else, the wireless device may consider the resumeCause is mt-Access.

When the resume of the RRC connection is triggered is triggered by upper layers, if it is triggered after release with redirect with mpsPriorityIndication, the wireless device may consider the resumeCause is mps-Priority- Access. If not, the wireless device may set the resumeCause in accordance with the information received from upper layers.

Then, in step S1804, the wireless device may determine whether (i) the specific RRC connection establishment cause and/or (ii) the specific RRC connection resume cause is included in the one or more causes. If (i) the specific RRC connection establishment cause and/or (ii) the specific RRC connection resume cause is included in the one or more causes, the wireless device may perform the early measurements according to the early measurement configuration. If (i) the specific RRC connection establishment cause and/or (ii) the specific RRC connection resume cause is not included in the one or more causes, the wireless device may not perform the early measurements.

According to some embodiments of the present disclosure, before step S1803, the wireless device may receive, from the network, a paging message including information on a specific paging cause. For example, the wireless device may initiate the RRC connection establishment procedure and/or the RRC connection resume procedure upon receiving the paging message.

In this case, in step S1803, the wireless device may determine the specific paging cause as the certain cause for the RRC connection establishment procedure and/or the RRC connection resume procedure.

In other words, if the RRC connection establishment procedure and/or the RRC connection resume procedure is triggered by the paging message, and a paging cause is indicated in the paging message, the wireless device may determine the certain cause in accordance with the paging cause indicated in the paging message.

Then, in step S1804, the wireless device may determine whether the specific paging cause is included the one or more causes. If the specific paging cause is included the one or more causes, the wireless device may perform the early measurements according to the early measurement configuration. If the specific paging cause is not included the one or more causes, the wireless device may not perform the early measurements.

In step S1805, a wireless device may report results of the early measurements.

For example, the wireless device may report the results of the early measurements via an RRC Setup Complete message or an RRC Resume Complete message.

For other example, the wireless device may report the results of the early measurements after completing the RRC connection establishment procedure and/or the RRC connection resume procedure.

According to some embodiments of the present disclosure, the wireless device may release the early measurement configuration based on the RRC connection establishment procedure and/or the RRC connection resume procedure being failed. For example, the wireless device may discard the early measurement configuration when the RRC connection establishment procedure and/or the RRC connection resume procedure is failed According to some embodiments of the present disclosure, the wireless device may release the results of the early measurements based on the RRC connection establishment procedure and/or the RRC connection resume procedure being failed. For example, the wireless device may discard the results of the early measurements, when the RRC connection establishment procedure and/or the RRC connection resume procedure is failed, although the results of the early measurements are not reported.

According to some embodiments of the present disclosure, the wireless device may be in communication with at least one of a user equipment, a network, or an autonomous vehicle other than the wireless device.

Figure 19:
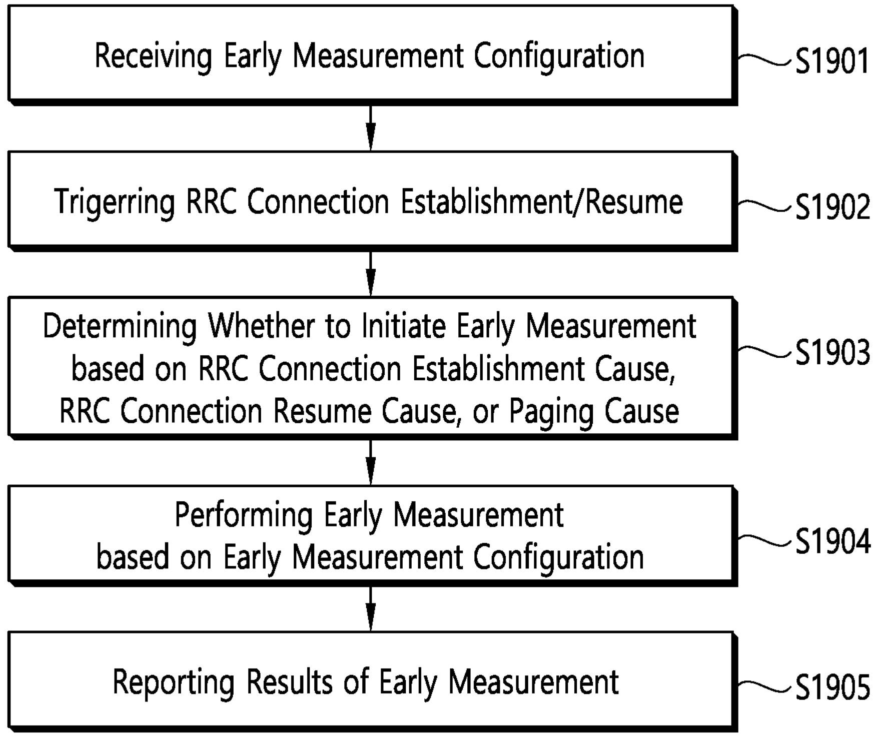
FIG. 19 shows an example of a method for selective early measurement based on the purpose of RRC connection in a wireless communication system, according to some embodiments of the present disclosure.

FIG. 19 shows an example of a method for selective early measurement based on the purpose of RRC connection in a wireless communication system, according to some embodiments of the present disclosure.

In particular, FIG. 19 shows an example of a method performed by a user equipment (UE) in a wireless communication system.

In FIG. 19, upon initiation of RRC connection establishment or RRC connection resume procedure, UE may determine whether to initiate the early measurement based on the RRC establishment cause, RRC resume cause, or paging cause.

In step S1901, UE may receive the early measurement configuration from a network.

The early measurement configuration may indicate a certain RRC connection establishment cause, RRC connection resume cause, or paging cause for which the early measurement is required. Otherwise, the early measurement configuration may indicate a certain RRC connection establishment cause, RRC connection resume cause, or paging cause for which the early measurement is not required.

The RRC connection establishment cause may be emergency, highPriorityAccess, mt-Access, mo-Signalling, mo-Data, mo-VoiceCall, mo-VideoCall, mo-SMS, mps-PriorityAccess, or mcs-PriorityAccess.

The RRC connection resume cause may be emergency, highPriorityAccess, mt-Access, mo-Signalling, mo-Data, mo-VoiceCall, mo-VideoCall, mo-SMS, ma-Update, mps-PriorityAccess, or mcs-PriorityAccess.

The paging cause may be a service type, for example, voice call.

The early measurement configuration may include the measurement object, for example, the target frequency or target cell to measure.

The RRC connection establishment cause, RRC connection resume cause, or paging cause for early measurement may be pre-defined to UE. Then, the RRC connection establishment cause, RRC connection resume cause, or paging cause is not indicated in the early measurement configuration.

The early measurement configuration may be provided via system information. When UE initiates the RRC connection establishment or resume in a serving cell, if the early measurement configuration is provided via system information from the serving cell, UE may initiate the early measurement according to the following steps. If the early measurement configuration is not provided via system information from the serving cell, UE may not perform the early measurement in the serving cell.

The early measurement configuration may be provided via dedicated signalling (for example, an RRC Reconfiguration) while UE is in RRC_CONNECTED.

In step S1902, the RRC connection establishment or the RRC connection resume may be triggered. For example, UE may trigger the RRC connection establishment or the RRC connection resume.

UE May Determine the RRC Connection Establishment Cause as Follows:

If the establishment of the RRC connection is the result of release with redirect with mpsPriorityIndication, the UE may consider the establishmentCause is mps-PriorityAccess. If not, UE may set the establishmentCause in accordance with the information received from upper layers, for example, a NAS layer.

UE May Determine the RRC Connection Resume Cause as Follows:

When the resume of the RRC connection is triggered by receiving a paging message, if the UE is configured by upper layers with Access Identity 1, the UE may consider the resumeCause is mps-PriorityAccess. Else if the UE is configured by upper layers with Access Identity 2, the UE may consider the resumeCause is highPriorityAccess. Else if the UE is configured by upper layers with one or more Access Identities equal to 11-15, the UE may consider the resumeCause is mcs-PriorityAccess. Else, the UE may consider the resumeCause is mt-Access.

When the resume of the RRC connection is triggered is triggered by upper layers, if it is triggered after release with redirect with mpsPriorityIndication, the UE may consider the resumeCause is mps-PriorityAccess. If not, the UE may set the resumeCause in accordance with the information received from upper layers.

If the establishment/resume of the RRC connection is triggered by receiving a paging message, and a paging cause is indicated in the paging message, the UE may set the paging cause in accordance with the paging cause indicated in the paging message.

In step S1903, UE may determine whether to initiate the early measurement based on the RRC connection establishment cause, RRC connection resume cause, or paging cause.

When the RRC connection establishment is triggered, if the establishment cause for which the early measurement is required is indicated in the early measurement configuration, and if the establishment cause determined by UE is the same as the establishment cause indicated in the early measurement configuration, the UE may initiate the early measurement. If the establishment cause for which the early measurement is required is indicated in the early measurement configuration, and if the establishment cause determined by UE is different from the establishment cause indicated in the early measurement configuration, the UE may not initiate the early measurement.

When the RRC connection establishment is triggered, if the establishment cause for which the early measurement is not required is indicated in the early measurement configuration, and if the establishment cause determined by UE is different from the establishment cause indicated in the early measurement configuration, the UE may initiate the early measurement. If the establishment cause for which the early measurement is not required is indicated in the early measurement configuration, and if the establishment cause determined by UE is the same as the establishment cause indicated in the early measurement configuration, the UE may not initiate the early measurement.

When the RRC connection resume is triggered, if the resume cause for which the early measurement is required is indicated in the early measurement configuration, and if the resume cause determined by UE is the same as the resume cause indicated in the early measurement configuration, the UE may initiate the early measurement. If the resume cause for which the early measurement is required is indicated in the early measurement configuration, and if the resume cause determined by UE is different from the resume cause indicated in the early measurement configuration, the UE may not initiate the early measurement.

When the RRC connection resume is triggered, if the resume cause for which the early measurement is not required is indicated in the early measurement configuration, and if the resume cause determined by UE is different from the resume cause indicated in the early measurement configuration, the UE may initiate the early measurement. If the resume cause for which the early measurement is not required is indicated in the early measurement configuration, and if the resume cause determined by UE is the same as the resume cause indicated in the early measurement configuration, the UE may not initiate the early measurement.

When the RRC connection establishment or RRC connection resume is triggered, if the paging cause for which the early measurement is required is indicated in the early measurement configuration, and if the paging cause indicated in the received paging message is the same as the paging cause indicated in the early measurement configuration, the UE may initiate the early measurement. If the paging cause for which the early measurement is required is indicated in the early measurement configuration, and if the paging cause indicated in the received paging message is different from the establishment cause indicated in the early measurement configuration, the UE may not initiate the early measurement.

When the RRC connection establishment or RRC connection resume is triggered, if the paging cause for which the early measurement is not required is indicated in the early measurement configuration, and if the paging cause indicated in the received paging message is different from the paging cause indicated in the early measurement configuration, the UE may initiate the early measurement. If the paging cause for which the early measurement is not required is indicated in the early measurement configuration, and if the paging cause indicated in the received paging message is the same as the establishment cause indicated in the early measurement configuration, the UE may not initiate the early measurement.

If the RRC connection establishment cause for which the early measurement is required is pre-defined, and if the RRC connection establishment is trigged by the pre-defined establishment cause, UE may initiate the early measurement. If the RRC connection establishment cause for which the early measurement is required is pre-defined, and if the RRC connection establishment is trigged by other establishment cause than the pre-defined establishment cause, UE may not initiate the early measurement.

If the RRC connection establishment cause for which the early measurement is not required is pre-defined, and if the RRC connection establishment is trigged by the pre-defined establishment cause, UE may not initiate the early measurement. If the RRC connection establishment cause for which the early measurement is not required is pre-defined, and if the RRC connection establishment is trigged by other establishment cause than the pre-defined establishment cause, UE may initiate the early measurement.

If the RRC connection resume cause for which the early measurement is required is pre-defined, and if the RRC connection resume is trigged by the pre-defined resume cause, UE may initiate the early measurement. If the RRC connection resume cause for which the early measurement is required is pre-defined, and if the RRC connection resume is trigged by other resume cause than the pre-defined resume cause, UE may not initiate the early measurement.

If the RRC connection resume cause for which the early measurement is not required is pre-defined, and if the RRC connection resume is trigged by the pre-defined resume cause, UE may not initiate the early measurement. If the RRC connection resume cause for which the early measurement is not required is pre-defined, and if the RRC connection resume is trigged by other resume cause than the pre-defined resume cause, UE may initiate the early measurement.

If the paging cause for which the early measurement is required is pre-defined, and if the RRC connection establishment/resume is trigged by the pre-defined paging cause, UE may initiate the early measurement. If the paging cause for which the early measurement is required is pre-defined, and if the RRC connection establishment/resume is trigged by other paging cause than the pre-defined paging cause, UE may not initiate the early measurement.

If the paging cause for which the early measurement is not required is pre-defined, and if the RRC connection establishment/resume is trigged by the pre-defined paging cause, UE may not initiate the early measurement. If the paging cause for which the early measurement is not required is pre-defined, and if the RRC connection establishment/resume is trigged by other paging cause than the pre-defined paging cause, UE may initiate the early measurement.

UE may initiate the early measurement configuration upon initiation of the RRC connection establishment or resume, or before initiation of the RRC connection establishment or RRC connection resume.

If a paging cause is indicated in the early measurement configuration, and the received paging message indicates the same paging cause, UE may initiate the early measurement upon receiving the paging message.

In step S1904, UE may perform the early measurement in accordance with the early measurement configuration.

In step S1905, UE may report the results of the early measurement to the network.

UE may report the results of the early measurement via the Measurement Report message. If UE has the results of the early measurement, UE may report the results of the early measurement upon completion of the initial AS security activation procedure.

UE may report the results of the early measurement via the RRCSetupComplete message or RRCResumeComplete message.

According to some embodiments of the present disclosure, UE may release of early measurement configuration and/or result.

If RRC connection establishment or resume procedure fails (for example, upon receiving an RRC reject message, upon receiving RRC release message, upon T300 expiry or upon T319 expiry), UE may discard the results of the early measurement and/or the early measurement configuration.

According to some embodiments of the present disclosure, a UE may receive an early measurement configuration from the network. The measurement configuration may indicate a certain establishment/resume/paging cause. The UE may trigger the RRC connection establishment/resume. The UE may initiate the early measurement according to the received early measurement configuration, if the RRC connection establishment/resume is triggered by the certain establishment/resume/paging cause.

Figure 20:
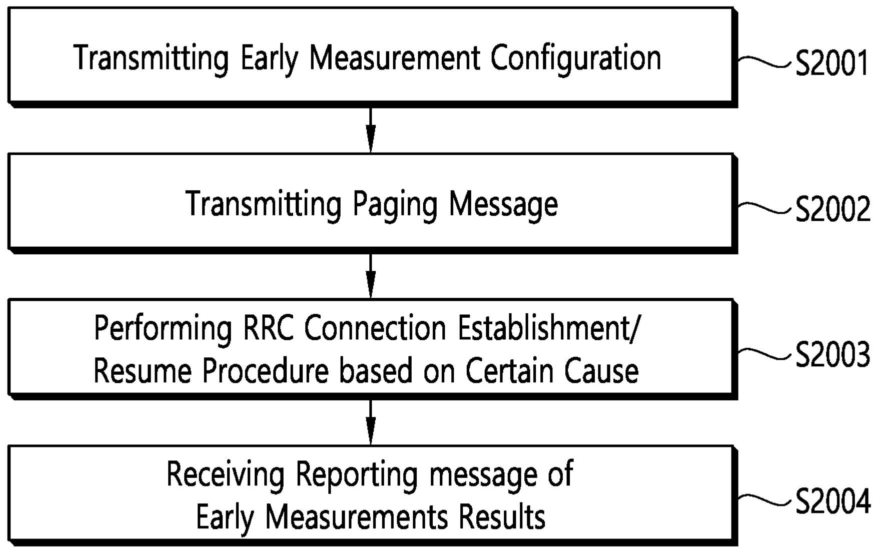
FIG. 20 shows an example of Base Station (BS) operations for selective early measurement in a wireless communication system, according to some embodiments of the present disclosure.

FIG. 20 shows an example of Base Station (BS) operations for selective early measurement in a wireless communication system, according to some embodiments of the present disclosure.

In step S2001, a BS may transmit, to a wireless device, an early measurement configuration. For example, the early measurement configuration may include one or more causes for early measurements.

In step S2002, a BS may transmit, to the wireless device, a paging message. For example, the paging message may include information on a paging cause.

In step S2003, a BS may perform a Radio Resource Control (RRC) connection establishment procedure and/or an RRC connection resume procedure with the wireless device based on a certain cause.

In step S2004, a BS may receive, from the wireless device, a reporting message including results of the early measurements performed by the wireless device, based on the certain cause being included in the one or more causes for the early measurements.

Some of the detailed steps shown in the examples of FIGS. 18, 19, and 20 may not be essential steps and may be omitted. In addition to the steps shown in FIGS. 18, 19, and 20, other steps may be added, and the order of the steps may vary. Some of the above steps may have their own technical meaning.

Hereinafter, an apparatus for selective early measurement in a wireless communication system, according to some embodiments of the present disclosure, will be described. Herein, the apparatus may be a wireless device (100 or 200) in FIGS. 2, 3, and 5.

For example, a wireless device may perform the methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, an early measurement configuration. The processor 102 may be configured to acquire information on one or more causes for early measurements. The processor 102 may be configured to initiate a Radio Resource Control (RRC) connection establishment procedure and/or an RRC connection resume procedure with a certain cause. The processor 102 may be configured to perform early measurements based on the certain cause being included in the one or more causes, upon initiating the RRC connection establishment procedure and/or the RRC connection resume procedure. The processor 102 may be configured to control the transceiver 106 to report results of the early measurements.

For example, the one or more causes for early measurements may be preconfigured to the wireless device.

For example, the one or more causes for early measurements may be included in the early measurement configuration.

For example, the one or more causes may include at least one of (i) an RRC connection establishment cause, (ii) an RRC connection resume cause, and/or (iii) a paging cause.

For example, the processor 102 may be configured to determine (i) a specific RRC connection establishment cause for the RRC connection establishment procedure and/or (ii) a specific RRC connection resume cause for the RRC connection resume procedure as the certain cause. Then, the processor 102 may be configured to determine whether (i) the specific RRC connection establishment cause and/or (ii) the specific RRC connection resume cause is included in the one or more causes.

For example, the processor 102 may be configured to control the transceiver 106 to receive, from the network, a paging message including information on a specific paging cause. Then, the processor 102 may be configured to determine the specific paging cause as the certain cause for the RRC connection establishment procedure and/or the RRC connection resume procedure. The processor 102 may be configured to determine whether the specific paging cause is included the one or more causes.

For example, the results of the early measurements may be reported via an RRC Setup Complete message or an RRC Resume Complete message.

For example, the processor 102 may be configured to release the early measurement configuration based on the RRC connection establishment procedure and/or the RRC connection resume procedure being failed.

For example, the processor 102 may be configured to release the results of the early measurements based on the RRC connection establishment procedure and/or the RRC connection resume procedure being failed.

For example, the early measurement configuration may be provided via system information.

For example, the processor 102 may be configured to control the transceiver 106 to be in communication with at least one of a user equipment, a network, or an autonomous vehicle other than the wireless device.

Hereinafter, a processor for a wireless device for selective early measurement in a wireless communication system, according to some embodiments of the present disclosure, will be described.

The processor may be configured to control the wireless device to receive, from a network, an early measurement configuration. The processor may be configured to control the wireless device to acquire information on one or more causes for early measurements. The processor may be configured to control the wireless device to initiate a Radio Resource Control (RRC) connection establishment procedure and/or an RRC connection resume procedure with a certain cause. The processor may be configured to control the wireless device to perform early measurements based on the certain cause being included in the one or more causes, upon initiating the RRC connection establishment procedure and/or the RRC connection resume procedure. The processor may be configured to control the wireless device to report results of the early measurements.

For example, the one or more causes for early measurements may be preconfigured to the wireless device.

For example, the one or more causes for early measurements may be included in the early measurement configuration.

For example, the one or more causes may include at least one of (i) an RRC connection establishment cause, (ii) an RRC connection resume cause, and/or (iii) a paging cause.

For example, the processor may be configured to control the wireless device to determine (i) a specific RRC connection establishment cause for the RRC connection establishment procedure and/or (ii) a specific RRC connection resume cause for the RRC connection resume procedure as the certain cause. Then, the processor may be configured to control the wireless device to determine whether (i) the specific RRC connection establishment cause and/or (ii) the specific RRC connection resume cause is included in the one or more causes.

For example, the processor may be configured to control the wireless device to receive, from the network, a paging message including information on a specific paging cause. Then, the processor may be configured to control the wireless device to determine the specific paging cause as the certain cause for the RRC connection establishment procedure and/or the RRC connection resume procedure. The processor may be configured to control the wireless device to determine whether the specific paging cause is included the one or more causes.

For example, the results of the early measurements may be reported via an RRC Setup Complete message or an RRC Resume Complete message.

For example, the processor may be configured to control the wireless device to release the early measurement configuration based on the RRC connection establishment procedure and/or the RRC connection resume procedure being failed.

For example, the processor may be configured to control the wireless device to release the results of the early measurements based on the RRC connection establishment procedure and/or the RRC connection resume procedure being failed.

For example, the early measurement configuration may be provided via system information.

For example, the processor may be configured to control the wireless device to be in communication with at least one of a user equipment, a network, or an autonomous vehicle other than the wireless device.

Hereinafter, a non-transitory computer-readable medium has stored thereon a plurality of instructions for selective early measurement in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, an early measurement configuration. The stored a plurality of instructions may cause the wireless device to acquire information on one or more causes for early measurements. The stored a plurality of instructions may cause the wireless device to initiate a Radio Resource Control (RRC) connection establishment procedure and/or an RRC connection resume procedure with a certain cause. The stored a plurality of instructions may cause the wireless device to perform early measurements based on the certain cause being included in the one or more causes, upon initiating the RRC connection establishment procedure and/or the RRC connection resume procedure. The stored a plurality of instructions may cause the wireless device to report results of the early measurements.

For example, the one or more causes for early measurements may be preconfigured to the wireless device.

For example, the one or more causes for early measurements may be included in the early measurement configuration.

For example, the one or more causes may include at least one of (i) an RRC connection establishment cause, (ii) an RRC connection resume cause, and/or (iii) a paging cause.

For example, the stored a plurality of instructions may cause the wireless device to determine (i) a specific RRC connection establishment cause for the RRC connection establishment procedure and/or (ii) a specific RRC connection resume cause for the RRC connection resume procedure as the certain cause. Then, the stored a plurality of instructions may cause the wireless device to determine whether (i) the specific RRC connection establishment cause and/or (ii) the specific RRC connection resume cause is included in the one or more causes.

For example, the stored a plurality of instructions may cause the wireless device to receive, from the network, a paging message including information on a specific paging cause. Then, the stored a plurality of instructions may cause the wireless device to determine the specific paging cause as the certain cause for the RRC connection establishment procedure and/or the RRC connection resume procedure. The stored a plurality of instructions may cause the wireless device to determine whether the specific paging cause is included the one or more causes.

For example, the results of the early measurements may be reported via an RRC Setup Complete message or an RRC Resume Complete message.

For example, the stored a plurality of instructions may cause the wireless device to release the early measurement configuration based on the RRC connection establishment procedure and/or the RRC connection resume procedure being failed.

For example, the stored a plurality of instructions may cause the wireless device to release the results of the early measurements based on the RRC connection establishment procedure and/or the RRC connection resume procedure being failed.

For example, the early measurement configuration may be provided via system information.

According to some embodiments of the present disclosure, the stored a plurality of instructions may cause the wireless device to be in communication with at least one of a user equipment, a network, or an autonomous vehicle other than the wireless device.

Hereinafter, a base station (BS) for selective early measurement in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, an early measurement configuration. For example, the early measurement configuration may include one or more causes for early measurements.

The processor may be configured to control the transceiver to transmit, to the wireless device, a paging message. For example, the paging message may include information on a paging cause.

The processor may be configured to perform a Radio Resource Control (RRC) connection establishment procedure and/or an RRC connection resume procedure with the wireless device based on a certain cause.

The processor may be configured to control the transceiver to receive, from the wireless device, a reporting message including results of the early measurements performed by the wireless device, based on the certain cause being included in the one or more causes for the early measurements.

The present disclosure can have various advantageous effects.

According to some embodiments of the present disclosure, a wireless device could selectively perform the early measurement by considering the purpose of the RRC connection.

For example, while the wireless device camps on a cell in FR2, the wireless device could save power by performing the selective early measurement.

In other words, UE can save power by initiating the enhanced early measurement selectively depending on the purpose of the RRC connection establishment/resume.

In other words, in the case of FR2, the results of early measurement may not be valid for a long time. Since the early measurements are performed for fast AC/DC setup and the fast AC/DC are only needed under certain situations (for example, having certain causes), the early measurements may be necessary only in the certain situations. According to the present disclosure, it is possible to save resources by performing the early measurements only in the certain situations.

According to some embodiments of the present disclosure, a wireless network system could provide an efficient solution for the early measurement considering the purpose of the RRC connection.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s)

can be combined to be implemented or performed in a method. Other implementations are within the scope of the following claims.

What is claimed is:

1. A method, comprising, receiving, by a wireless device from a network, a radio resource control (RRC) release message including measurement configuration for RRC idle state or RRC inactive state;

receiving, by the wireless device from the network, a paging message including information on a paging cause;

determining, by the wireless device, the paging cause as a cause value for an RRC connection establishment procedure or an RRC connection resume procedure; and initiating, by the wireless device, the RRC connection establishment procedure or the RRC connection resume procedure based on the cause value;

based on that the cause value informs that the RRC connection establishment procedure or the RRC connection resume procedure is caused for mobile originated (MO) signalling or voice call:

skipping, by the wireless device, initiating early measurements; and releasing, by the wireless device, the measurement configuration for RRC idle state or RRC inactive state, based on that the RRC connection establishment procedure or the RRC connection resume procedure failed, based on that the cause value informs that the RRC connection establishment procedure or the RRC connection resume procedure is not caused for MO signalling or voice call:

performing, by the wireless device, early measurements based on the measurement configuration for RRC idle state or RRC inactive state;

transmitting, by the wireless device to the network, an RRC setup complete message or an RRC resume complete message including measurement results for the early measurements, based on that the RRC connection establishment procedure or the RRC connection resume procedure is successful; and releasing, by the wireless device, (i) the measurement configuration for RRC idle state or RRC inactive state and (ii) the measurement results for the early measurements, based on that the RRC connection establishment procedure or the RRC connection resume procedure failed.

2. The method of claim 1, wherein the wireless device is in communication with at least one of a user equipment, a network, or an autonomous vehicle other than the wireless device.

3. A wireless device, comprising:

a transceiver;

a memory; and at least one processor operatively coupled to the transceiver and the memory, and adapted to perform operations, the operations comprising:

receiving, from a network, a radio resource control (RRC) release message including measurement configuration for RRC idle state or RRC inactive state;

receiving, from the network, a paging message including information on a paging cause;

determining the paging cause as a cause value for an RRC connection establishment procedure or an RRC connection resume procedure; and initiating the RRC connection establishment procedure or the RRC connection resume procedure based on the cause value;

based on that the cause value informs that the RRC connection establishment procedure or the RRC connection resume procedure is caused for mobile originated (MO) signalling or voice call:

skipping initiating early measurements; and releasing the measurement configuration for RRC idle state or RRC inactive state, based on that the RRC connection establishment procedure or the RRC connection resume procedure failed, based on that the cause value informs that the RRC connection establishment procedure or the RRC connection resume procedure is not caused for MO signalling or voice call:

performing early measurements based on the measurement configuration for RRC idle state or RRC inactive state;

transmitting, to the network, an RRC setup complete message or a resume complete message including measurement results for the early measurements, based on that the RRC connection establishment procedure or the RRC connection resume procedure is successful; and releasing (i) the measurement configuration for RRC idle state or RRC inactive state and (ii) the measurement results for the early measurements, based on that the RRC connection establishment procedure or the RRC connection resume procedure failed.

4. A non-transitory computer-readable medium having stored thereon a plurality of instructions, which, when executed by a processor of a wireless device, cause the wireless device to perform operations, the operations comprising:

receiving, from a network, a radio resource control (RRC) release message including measurement configuration for RRC idle state or RRC inactive state;

receiving, from the network, a paging message including information on a paging cause;

determining the paging cause as a cause value for an RRC connection establishment procedure or an RRC connection resume procedure; and initiating the RRC connection establishment procedure or the RRC connection resume procedure based on the cause value;

based on that the cause value informs that the RRC connection establishment procedure or the RRC connection resume procedure is caused for mobile originated (MO) signalling or voice call:

skipping initiating early measurements; and releasing the measurement configuration for RRC idle state or RRC inactive state, based on that the RRC connection establishment procedure or the RRC connection resume procedure failed, based on that the cause value informs that the RRC connection establishment procedure or the RRC connection resume procedure is not caused for MO signalling or voice call:

performing early measurements based on the measurement configuration for RRC idle state or RRC inactive state;

transmitting, to the network, an RRC setup complete message or an RRC resume complete message including measurement results for the early measurements, based on that the RRC connection establishment procedure or the RRC connection resume procedure is successful; and releasing (i) the measurement configuration for RRC idle state or RRC inactive state and (ii) the measurement results for the early measurements, based on that the RRC connection establishment procedure or the RRC connection resume procedure failed.

* * * * *